（12） United States Patent
Vishne et al.

(10) Patent No.: US 9,864,654 B2
(45) Date of Patent: Jan. 9, 2018

(54) DETECTING DATA INDICATED AS BEING UNCORRECTABLE AT A DATA STORAGE DEVICE

(71) Applicant: SANDISK TECHNOLOGIES INC., Plano, TX (US)

(72) Inventors: Gadi Vishne, Petach-Tikva (IL); Joshua Lehmann, Modiin (IL); David Haliva, Rehovot (IL)

(73) Assignee: SanDisk Technologies LLC, Plano, TX (US)

( * ) Notice: Subject to any disclaimer, the term of this patent is extended or adjusted under 35 U.S.C. 154(b) by 56 days.

(21) Appl. No.: 14/860,263

(22) Filed: Sep. 21, 2015

(65) Prior Publication Data

US 2017/0083402 A1 Mar. 23, 2017

(51) Int. Cl.
*G11C 29/00* (2006.01)
*G06F 11/10* (2006.01)

(52) U.S. Cl.
CPC .................. *G06F 11/1076* (2013.01)

(58) Field of Classification Search
CPC .. G06F 11/1076; G06F 3/0619; G06F 3/0623; G06F 3/064; G06F 3/0673; G06F 11/1048; G06F 21/62; G06F 21/64; G06F 21/6218; G06F 21/80; G06F 2221/2107; G06F 11/1435; H03M 13/09; H03M 13/6561; H03M 13/1545; H03M 13/1555; H03M 13/1525
See application file for complete search history.

(56) References Cited

U.S. PATENT DOCUMENTS

| | | | |
|---|---|---|---|
| 6,425,098 B1 | 7/2002 | Sinquin et al. | |
| 7,181,673 B2 | 2/2007 | Sollish | |
| 8,799,681 B1* | 8/2014 | Linnell | G06F 21/62 380/277 |
| 2010/0031058 A1* | 2/2010 | Kito | G06F 11/1435 713/193 |
| 2012/0144261 A1* | 6/2012 | Hong | G06F 11/1048 714/755 |
| 2014/0325013 A1 | 10/2014 | Tamir et al. | |
| 2016/0224466 A1* | 8/2016 | You | G06F 12/0811 |
| 2016/0307593 A1* | 10/2016 | Yahata | G11B 20/00246 |

* cited by examiner

*Primary Examiner* — Guerrier Merant
(74) *Attorney, Agent, or Firm* — Toler Law Group, PC

(57) ABSTRACT

A data storage device includes a memory and a controller coupled to the memory. The memory is configured to store first data and second data. The controller is configured to unlock the first data using a first key, to unlock the second data using a second key, and to determine that the second data is indicated as being uncorrectable in response to unlocking the second data using the second key.

29 Claims, 7 Drawing Sheets ical example of a
DETECTING DATA INDICATED AS BEING UNCORRECTABLE AT A DATA STORAGE DEVICE

FIELD OF THE DISCLOSURE

The present disclosure is generally related to data storage devices and more particularly to data reading and writing processes for data storage devices.

BACKGROUND

Storage devices enable users to store and retrieve data. Examples of storage devices include volatile memory devices and non-volatile memory devices. A non-volatile memory retains data after a power-down event. During operation, a controller of a storage device may use control information related to operation of a memory. For example, the controller may store one or more tables indicating parameters (e.g., read parameters or write parameters) associated with operation of the memory.

In some circumstances, a large data size of the control information may slow operation of the storage device. For example, a large table of parameters may be written to the memory prior to a power-down event and may be read from the memory in response to a power-on event, which may consume time, memory space, power, and processing resources. Searching a large table for information also consumes time, power, and processing resources of the storage device.

DETAILED DESCRIPTION

A data storage device may use a particular key to "lock" (e.g., scramble, encrypt, and/or randomize) data to indicate that the data is uncorrectable (e.g., to flag the data as being uncorrectable). For example, if a certain command is received from a device (e.g., a host device) to flag the data as being uncorrectable, the data storage device may lock the data using the particular key (e.g., instead of storing information in a table indicating that the data is to be flagged as uncorrectable). As another example, if the data storage device writes dummy data to a storage region (e.g., to "fill" the storage region), the data storage device may lock the dummy data with the particular key. The data may include "ambiguous" data that can be read successfully (or "unlocked") using certain parameters (e.g., the particular key) and that cannot be unlocked using other parameters (e.g., "standard" parameters, such as a user data scrambling key, a user data encryption key, or another user data key) of the data storage device.

In response to reading the data during operation (e.g., based on a command from the device or in connection with another process), the data storage device may attempt to unlock the data using one or more keys (e.g., a user data key). If the one or more other keys fail to unlock the data, and if the particular key successfully unlocks the data, then a determination may be made that the data has been flagged as uncorrectable (e.g., that the data is intended to be uncorrectable and that no error has occurred). If none of the keys unlocks the data, the data storage device may detect occurrence of an uncorrectable error correcting code (UECC) error (e.g., that the data is intended to be correctable and that an error has occurred). Locking the data using the particular key enables the data storage device to avoid storing and accessing a table that indicates which data is flagged as uncorrectable.

Particular aspects of the disclosure are described below with reference to the drawings. In the description, common or similar features may be designated by common reference numbers. As used herein, "exemplary" may indicate an example, an implementation, and/or an aspect, and should not be construed as limiting or as indicating a preference or a preferred implementation.

Figure 1:
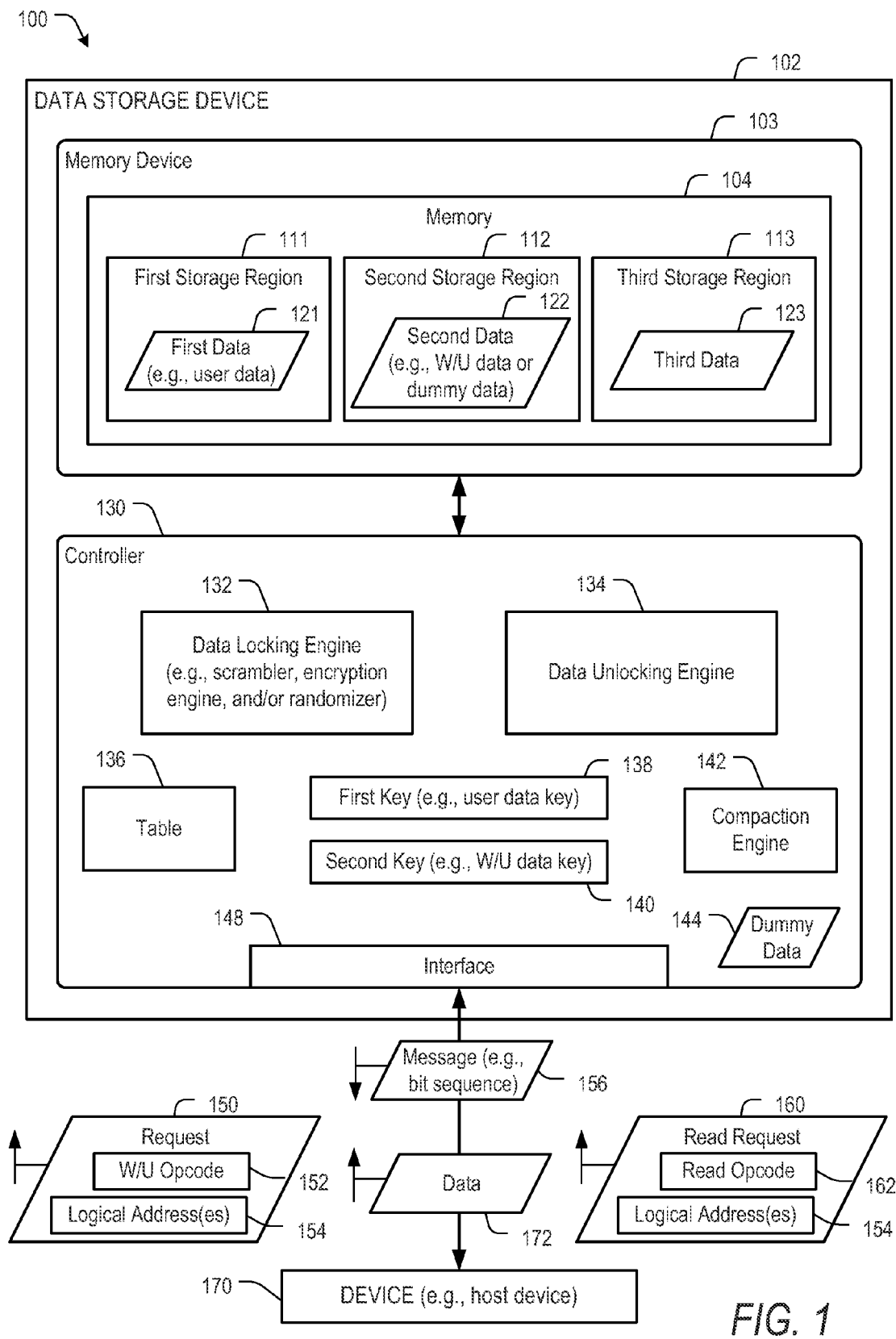
FIG. 1 is a diagram of a particular illustrative example of a system that includes a data storage device having a data unlocking engine.

Referring to FIG. 1, a particular illustrative example of a system is depicted and generally designated 100. The system 100 includes a data storage device 102 and a device 170 (e.g., a host device or an access device).

The data storage device 102 includes a memory device 103. The memory device 103 may include one or more memory dies (e.g., one memory die, two memory dies, sixty-four memory dies, or another number of memory dies).

The memory device 103 includes a memory 104, such as a non-volatile array of storage elements included in a memory die or a volatile memory. The memory 104 may include a flash memory (e.g., a NAND flash memory) or a resistive memory, such as a resistive random access memory (ReRAM), as illustrative examples. The memory 104 may have a three-dimensional (3D) memory configuration. As used herein, a 3D memory device may include multiple physical levels of storage elements (instead of having a single physical level of storage elements, as in a planar memory device). As an example, the memory 104 may have a 3D vertical bit line (VBL) configuration. In a particular implementation, the memory 104 is a non-volatile memory having a 3D memory array configuration that is monolithically formed in one or more physical levels of arrays of memory cells having an active area disposed above a silicon substrate. Alternatively, the memory 104 may have another configuration, such as a two-dimensional (2D) memory configuration or a non-monolithic 3D memory configuration (e.g., a stacked die 3D memory configuration).

The memory 104 includes one or more regions of storage elements, such as a first storage region 111, a second storage region 112, and a third storage region 113. An example of a storage region is a memory die. Another example of a storage region is a block, such as a NAND flash erase group of storage elements, or a group of resistance-based storage elements in a ReRAM implementation. Another example of a storage region is a word line of storage elements (e.g., a word line of NAND flash storage elements or a word line of resistance-based storage elements). A storage region may have a single-level-cell (SLC) configuration, a multi-level-cell (MLC) configuration, or a tri-level-cell (TLC) configuration, as illustrative examples. Each storage element of the memory 104 may be programmable to a state (e.g., a threshold voltage in a flash configuration or a resistive state in a resistive memory configuration) that indicates one or more values. As an example, in an illustrative TLC scheme, a storage element may be programmable to a state that indicates three values. As an additional example, in an illustrative MLC scheme, a storage element may be programmable to a state that indicates two values.

The memory 104 further includes a controller 130 coupled to the memory device 103. The controller 130 may include a data locking engine 132, a data unlocking engine 134, a compaction engine 142, and an interface 148. In some implementations, the controller 130 may also include an error correcting code (ECC) engine (e.g., one or more encoders and one or more decoders).

The data locking engine 132 may include one or more of a scrambler, an encryption engine, a randomizer configured to randomize information, another component or module, or a combination thereof. The data unlocking engine 134 may include one or more of a descrambler, a decryption engine, a de-randomizer configured to de-randomize information, another component or module, or a combination thereof. In some implementations, functions described with reference to the data locking engine 132 and the data unlocking engine 134 may be performed by a single component of the controller 130. As a non-limiting illustrative example, the controller 130 may be configured to perform symmetric key encryption and decryption using a common component of the controller 130.

The controller 130 may store a table 136 and multiple keys. For example, the multiple keys may include a first key 138 and a second key 140. Although FIG. 1 depicts two keys 138, 140 for illustration, it should be appreciated that the controller 130 may use more than two keys. In some implementations, the first key 138 corresponds to a user data key that is reserved for user data, and the second key 140 corresponds to a write uncorrectable (W/U) data key that is reserved to flag information as being uncorrectable. The first key 138 may include one or more scrambling keys, a symmetric encryption key, multiple asymmetric encryption keys (e.g., an encryption key and a corresponding decryption key), one or more read parameters, one or more other parameters, or a combination thereof. The second key 140 may include one or more scrambling keys, a symmetric encryption key, multiple asymmetric encryption keys (e.g., an encryption key and a corresponding decryption key), one or more read parameters, one or more other parameters, or a combination thereof.

The data storage device 102 and the device 170 may be coupled via a connection, such as a bus, a wireless connection, a network connection, or another connection. The connection may be a bus interface, such as a serial advanced technology attachment (SATA) or peripheral component interface express (PCIe) interface. In one embodiment, the bus interface may be a non-volatile memory express (NVMe) or fiber channel over Ethernet (FCoE) interface. The system 100 may correspond to a solid state drive (SSD), such as found in computing devices, such as laptop computers, and tablet computers. In some implementations, the system 100, the data storage device 102, or the memory 104 may be integrated within a network-accessible data storage system, such as an enterprise data system, a network-attached storage (NAS) system, or a cloud data storage system, as illustrative examples.

During operation, the data storage device 102 is configured to receive data and instructions from the device 170 using an interface 148. For example, the controller 130 may receive data 172 (e.g., user data) from the device 170 via the interface 148. The controller 130 may receive a request for write access to the memory 104 from the device 170, and the request may include the data 172. The controller 130 may be configured to perform one or more other operations, such as "maintenance" operations. For example, the controller 130 may be configured to perform one or more memory management functions, such as wear leveling (distributing writes to avoid wearing out specific storage regions that would otherwise be repeatedly written to) and garbage collection (after a storage region is full, moving only the valid pages of data to a new storage region, so the full storage region can be erased and reused).

In response to receiving the data 172 from the device 170, the controller 130 may input the data 172 to the data locking engine 132. For example, the controller 130 may lock data (e.g., scramble or encrypt the data) in connection with write processes to reduce errors and/or increase data security at the data storage device 102 (e.g., prior to or after encoding the data by an ECC engine of the controller 130). The data locking engine 132 may lock the data 172 (e.g., using the first key 138) to generate first data 121 (e.g., prior to or after encoding the data 172 by an ECC engine of the controller 130). For example, the data locking engine 132 may scramble the data 172, encrypt the data 172, randomize the data 172, perform one or more other operations, or a combination thereof. The first key 138 may correspond to one or more "default" or "standard" parameters that are used to lock (e.g., scramble or encrypt) user data prior to writing user data to the memory 104.

In response to the data locking engine 132 locking the data 172 to generate the first data 121, the controller 130 may initiate a write process to write the first data 121 to the memory 104. For example, the controller 130 may send the first data 121 to the memory device 103 with a command to write the first data 121 to one or more physical addresses of the memory 104.

The controller 130 may initiate a read process to read the first data 121. For example, the controller 130 may initiate the read process in response to receiving a request for read access to the first data 121 from the device 170. As another example, the controller 130 may initiate the read process in response to an "internal" event (e.g., a maintenance event), such as in connection with a compaction process initiated by the compaction engine 142.

In response to initiating the read process, the controller 130 may send a command to the memory device 103 to read the first data 121. The memory device 103 may sense the first data 121 and may provide the first data 121 (or a representation of the first data 121) to the controller 130 in response to the command.

The controller 130 may input the first data 121 to the data unlocking engine 134 to unlock the first data 121. For example, the data unlocking engine 134 may use the first key 138 to descramble the first data 121, to decrypt the first data 121, to de-randomize the first data 121, to perform one or more other operations, or a combination thereof. In some implementations, the controller 130 may input the first data 121 to an ECC engine of the controller 130 to decode the first data 121 prior to or after unlocking the first data 121 using the data unlocking engine 134.

In some circumstances, the controller 130 may indicate (e.g., "flag") data as being uncorrectable or may indicate a storage region of the memory 104 as storing uncorrectable data. For example, a protocol used by the data storage device 102 to communicate with the device 170 may define a request 150. The request 150 may include an opcode, such as a write uncorrectable (W/U) data opcode 152, and may further specify one or more logical addresses 154. The W/U data opcode 152 may indicate that the controller 130 has associated the one or more logical addresses 154 with W/U data. For example, the W/U data opcode 152 may indicate that the controller 130 is to provide a message 156 (e.g., an error message) in response to receiving a request for read access from the device 170 to data associated with the one or more logical addresses 154. To further illustrate, in some protocols, the request 150 may be used to verify operation of the data storage device 102, such as by enabling verification of certain operations that are to result in an error message, such as the message 156. Depending on the particular protocol, the request 150 may include information such as dummy data 144 to be written to the memory 104 in response the request 150. In other cases, the request 150 may not include such information. For example, in some implementations, the controller 130 may generate information (e.g., the dummy data 144) in response to the request 150, such as using a pseudo-random number generator (PRNG) of the controller 130, as an illustrative example.

Alternatively or in addition, the controller 130 may flag data or a storage region of the memory 104 in connection with one or more other operations. As an example, the controller 130 may write dummy data to the second storage region 112 of the memory 104, such as after closing the second storage region 112 to write operations (e.g., in response to a threshold number of program/erase (P/E) cycles at the second storage region 112). As another example, dummy data may be written to the memory 104 in connection with a compaction process initiated by the compaction engine 142. The compaction process may include copying data from the first storage region 111 to the second storage region 112 (or vice versa). In these examples, the controller 130 may flag the dummy data as being uncorrectable (e.g., to avoid maintaining a table indicating memory locations of dummy data).

The controller 130 may initiate a process to flag information (e.g., the dummy data 144) as being uncorrectable. For example, the controller 130 may input the dummy data 144 to the data locking engine 132. The data locking engine 132 may lock dummy data 144 (e.g., using the second key 140) to generate second data 122. For example, the data locking engine 132 may scramble the dummy data 144, encrypt the dummy data 144, randomize the dummy data 144, perform one or more other operations, or a combination thereof.

In response to locking the dummy data 144 to generate the second data 122, the controller 130 may initiate a write process to write the second data 122 to the memory 104 (e.g., in response to receiving the request 150 from the device 170 or in connection with another process, such as a compaction process). For example, the controller 130 may be configured to write the second data 122 to the memory device 103 with a command to write the second data 122 to one or more physical addresses of the memory 104.

The controller 130 may initiate a read process to access the second data 122. For example, the controller 130 may initiate the read process in response to receiving a read request 160 for read access to the second data 122 from the device 170. The read request 160 may include a read opcode 162 and may identify the one or more logical addresses 154. As another example, the controller 130 may initiate the read process in response to an "internal" event (e.g., a maintenance event), such as in connection with a compaction process initiated by the compaction engine 142.

In response to initiating the read process, the controller 130 may send a command to the memory device 103 to read the second data 122. The memory device 103 may sense the second data 122 and may provide the second data 122 (or a representation of the second data 122) to the controller 130 in response to the command.

The controller 130 may input the second data 122 to the data unlocking engine 134 to unlock the second data 122. For example, the data unlocking engine 134 may attempt to unlock the second data 122 using the first key 138. Because the second data 122 is locked using the second key 140 (instead of the first key 138), use of the first key 138 fails to unlock the second data 122. In some implementations, the first key 138 fails to unlock the second data 122 if one or more conditions are unsatisfied upon applying the first key 138 to the second data 122, such as if the second data 122 fails to satisfy one or more parity conditions, one or more error correction conditions, and/or one or more hash conditions associated with the first key 138. To further illustrate, a signature may be generated based on (or extracted from) the second data 122, as described further with reference to FIG. 2.

In response to failing to unlock the second data 122 using the first key 138, the data unlocking engine 134 may use the second key 140 to unlock the second data 122. For example, the data unlocking engine 134 may use the second key 140 to descramble the second data 122, to decrypt the second data 122, to de-randomize the second data 122, to perform one or more other operations, or a combination thereof.

In response to unlocking the second data 122 using the second key 140, the controller 130 may determine that the second data 122 is indicated as being uncorrectable (e.g., that the second data 122 is intended to be uncorrectable). For example, the controller 130 may determine that the second data 122 was written to the memory 104 in response to a request (e.g., the request 150) to program W/U data to the memory 104 and/or that the second data 122 includes dummy data.

If the read process to read the second data 122 is performed in response to the request 150, the controller 130 may be configured to send a message (e.g., the message 156) to the device 170 in response to determining that the second data 122 is indicated as being uncorrectable. The message 156 may indicate that data corresponding to the one or more logical addresses 154 is uncorrectable. To illustrate, the message 156 may include a particular sequence of bit values (e.g., a sequence of logic zero bits) indicating an error, such as a W/U data error.

In some cases, the data unlocking engine 134 may fail to unlock data using both the first key 138 and the second key 140. To illustrate, the controller 130 may initiate a read process to read third data 123 (e.g., in response to a request from the device 170, or in response to another event, such as initiation of a compaction process). The controller 130 may receive the third data 123 (or a representation of the third data 123) from the memory device 103 and may input the third data 123 to the data unlocking engine 134. In some implementations, the first key 138 and the second key 140 may fail to unlock the third data 123 if one or more conditions are unsatisfied upon applying the first key 138 and the second key 140 to the third data 123. For example, if applying the first key 138 and the second key 140 to the third data 123 fails to satisfy one or more parity conditions, one or more error correction conditions, and/or one or more hash conditions, then the first key 138 and the second key 140 fail to unlock the third data 123. To further illustrate, a signature may be generated based on (or extracted from) the third data 123, as described further with reference to FIG. 2.

If the data unlocking engine 134 fails to unlock the third data 123 using the first key 138 and also fails to unlock the third data 123 using the second key 140, the controller 130 may determine that an uncorrectable error correcting code (UECC) event has occurred (e.g., that the third data 123 is unintentionally uncorrectable). Depending on the particular circumstances, the third data 123 may include user data or dummy data that has been corrupted (e.g., by a hardware error or by a disturb effect, as illustrative examples).

In response to detecting the UECC event, the controller 130 may update the table 136. For example, the controller 130 may update a number of UECC events associated with the third storage region 113. If a number of UECC events associated with a particular storage region of the memory 104 satisfies a threshold number of UECC events, the controller 130 may detect a physical defect associated with the particular storage region and may close the particular storage region to write operations. For example, if the UECC event associated with the third data 123 causes the number of UECC events associated with the third storage region 113 to satisfy the threshold number of UECC events, the controller 130 may close the third storage region 113 to write operations. In this case, valid data stored at the third storage region 113 may be copied to another storage region of the memory 104 (e.g., to the first storage region 111, as an illustrative example).

The examples of FIG. 1 enable the data storage device 102 to avoid maintaining and searching one or more tables to identify data flagged as being uncorrectable. Therefore, performance of the data storage device 102 may be improved by increasing read process speed (e.g., since the second key 140 may be used relatively infrequently) and by reducing an amount of storage space of the data storage device 102 used to store one or more tables.

Figure 2:
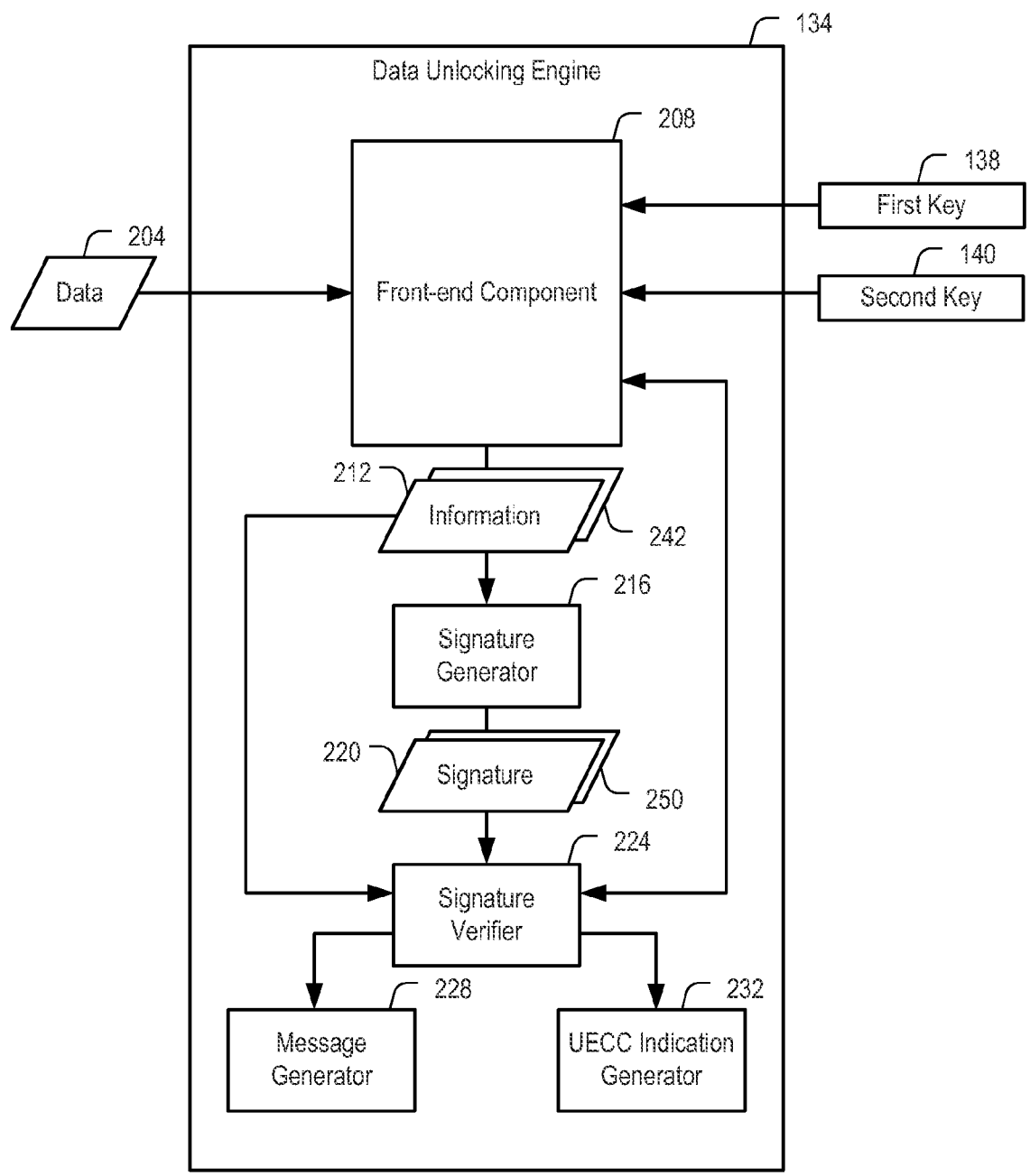
FIG. 2 is a diagram illustrating particular aspects of an illustrative example of a data unlocking engine, such as the data unlocking engine of FIG. 1.

FIG. 2 depicts certain aspects of an illustrative example of the data unlocking engine 134 of FIG. 1. The illustrative example of FIG. 2 depicts that the data unlocking engine 134 may include a front-end component 208, a signature generator 216 that is coupled to the front-end component 208, and a signature verifier 224 that is coupled to the front-end component 208 and to the signature generator 216. The data unlocking engine 134 may also include a message generator 228 and a UECC indication generator 232. The message generator 228 and the UECC indication generator 232 may be coupled to the signature verifier 224.

During operation, the controller 130 of FIG. 1 may provide data 204 to the front-end component 208 of the data unlocking engine 134 (e.g., upon reading the data 204 from the memory 104 of FIG. 1). Depending on the particular example, the data 204 may include the first data 121, the second data 122, the third data 123, or other data. The data 204 may include scrambled data, encrypted data, randomized data, other data, or a combination thereof.

The front-end component 208 may be configured to perform one or more operations in response to receiving the data 204. For example, the front-end component 208 may be configured to apply the first key 138 to the data 204 to generate information 212. Applying the first key 138 may include descrambling the data 204 based on the first key 138, decrypting the data 204 based on the first key 138, de-randomizing the data 204 based on the first key 138, performing one or more other operations, or a combination thereof. As a particular illustrative example, the front-end component 208 may include a hardware decryption circuit configured to decrypt the data 204 (or to attempt to decrypt the data 204) using the first key 138.

The signature generator 216 may be configured to receive the information 212 from the front-end component 208. The signature generator 216 may be configured to generate (or extract) a signature 220 based on the information 212. The signature 220 may be generated based on one or more parity conditions, one or more error correction conditions, or a combination thereof. As an illustrative non-limiting example, a parity condition or an error correction condition may specify a particular number of logic zero bits of user data, a particular number of logic one bits of user data, or a combination thereof. In this example, the signature 220 may include a value indicating a number of logic zero bits of the information 212, a number of logic one bits of the information 212, or a combination thereof. Alternatively or in addition, the signature 220 may include error information associated with the information 212. For example, in some ECC schemes, a number of errors, one or more error locations, and/or bit error rate (BER) associated with the information 212 may be estimated (e.g., either with or without performing a "full" decoding process of the data 204), such as by counting a number and/or bit position of particular bits or bit sequences. Alternatively or in addition, the signature 220 may include a hash value associated with the information 212. In this example, the signature generator 216 may include a hash function circuit configured to determine a hash value of the information 212 based on a hash function.

The signature verifier 224 may be configured to determine whether the signature 220 indicates that the data 204 has been unlocked successfully (e.g., based on whether the information 212 satisfies one or more parity conditions, one or more error correction conditions, one or more hash conditions, one or more other conditions, or a combination thereof). For example, the signature 220 may include parity information, and the signature verifier 224 may be configured to determine whether the parity information "matches" the information 212. Alternatively or in addition, the signature 220 may indicate error information (e.g., a number of errors, one or more error locations, or a BER) associated with the information 212, and the signature verifier 224 may be configured to determine whether the error information satisfies an error threshold. Alternatively or in addition, the signature 220 may include a hash value, and the signature verifier 224 may be configured to determine whether the hash value is "correct" (e.g., by comparing the hash value to one or more reference hash values).

If the signature verifier 224 determines based on the signature 220 that the data 204 has been unlocked successfully, the data unlocking engine 134 may output the information 212. Depending on the particular example, the information 212 may be provided to the device 170 of FIG. 1 (e.g., in response to the read request 160), to the memory device 103 (e.g., in connection with a compaction operation initiated by the compaction engine 142), or to another component or module of the controller 130. In this example, the data 204 may include the first data 121 of FIG. 1.

If the signature verifier 224 determines based on the signature 220 that the data 204 has not been unlocked successfully, the signature verifier 224 may provide an indication to the front-end component 208 that the signature 220 does not "match" the information 212. In response to the indication, the front-end component 208 may apply the second key 140 to the data 204. For example, the front-end component 208 may generate second information 242 and may provide the second information 242 to the signature generator 216. The signature generator 216 may generate a second signature 250 based on the second information 242 and may provide the second signature 250 to the signature verifier 224. The signature verifier 224 may compare the second signature 250 and the second information 242 to determine whether the second signature 250 indicates that the data 204 has been successfully unlocked using the second key 140.

If the signature verifier 224 determines based on the second signature 250 that the data 204 has been successfully unlocked using the second key 140, the data unlocking engine 134 may determine that the data 204 is indicated as being uncorrectable. For example, if the second key 140 is reserved for flagging data as being uncorrectable, then successfully unlocking the data 204 using the second key 140 may indicate that the data 204 has been flagged as being uncorrectable. Depending on the particular example, upon detecting that the data 204 is flagged as being uncorrectable, the controller 130 may provide the message 156 to the device 170 in response to receiving the read request 160, or the controller 130 may perform one or more other operations (e.g., operations associated with a compaction process initiated by the compaction engine 142). To further illustrate, the signature verifier 224 may output a control signal causing the message generator 228 to generate the message 156 or another message, such as a message provided to the compaction engine 142 indicating that the data 204 is indicated as being uncorrectable.

Alternatively, if the signature verifier 224 determines based on the second signature 250 that the data 204 has not been successfully unlocked using the second key 140, the data unlocking engine 134 may determine that an unrecoverable error (e.g., a UECC error) has occurred. In this case, the signature verifier 224 may provide a control signal to the UECC indication generator 232, and the UECC indication generator 232 may output an indication of the UECC error. In some implementations, the controller 130 may update the table 136 in response to the UECC indication provided by the UECC indication generator 232 (e.g., to track a number of UECC errors at the memory 104 in order to detect one or more physical defects or hardware errors).

Although the second key 140 has been described in terms of a single key, it should be appreciated that certain implementations may utilize multiple keys corresponding to the second key 140. For example, the data unlocking engine 134 may utilize multiple keys to determine an error type (e.g., an error "severity") associated with the data 204, such as if the second key 140 corresponds to a plurality of keys representing a range of error types (e.g., a low error severity, a moderate error severity, and a high error severity). In this example, the data unlocking engine 134 may attempt to unlock the data 204 using a first particular key of the plurality of keys. If the data unlocking engine 134 determines (e.g., based on the signature 220) that the first particular key successfully unlocks the data 204, then the data unlocking engine 134 may detect a low error severity associated with the data 204. If the data unlocking engine 134 fails to unlock the data 204 using the first particular key, the data unlocking engine 134 may attempt to unlock the data 204 using a second particular key of the plurality of keys.

If the data unlocking engine 134 unlocks the data 204 using the second particular key (and fails to unlock the data 204 using the first particular key), the data unlocking engine 134 may detect a moderate error severity associated with the data 204. Alternatively, if the data unlocking engine 134 fails to unlock the data 204 using the first particular key and the second particular key, the data unlocking engine 134 may detect a high error severity associated with the data 204. In some implementations, the controller 130 may update the table 136 based on the error severity (e.g., to track a number and/or severity of errors in order to detect one or more physical defects or hardware errors associated with the memory 104). Further, although two keys corresponding to the second key 140 have been described, it should be appreciated that the plurality of keys may include another number of keys (e.g., three keys, four keys, or another number of keys).

The example of FIG. 2 may improve performance of a data storage device. For example, a data storage device may avoid maintaining and searching one or more tables to identify data flagged as being uncorrectable (e.g., by using the second key 140 to identify data indicated as being uncorrectable instead of using a table).

Figure 3:
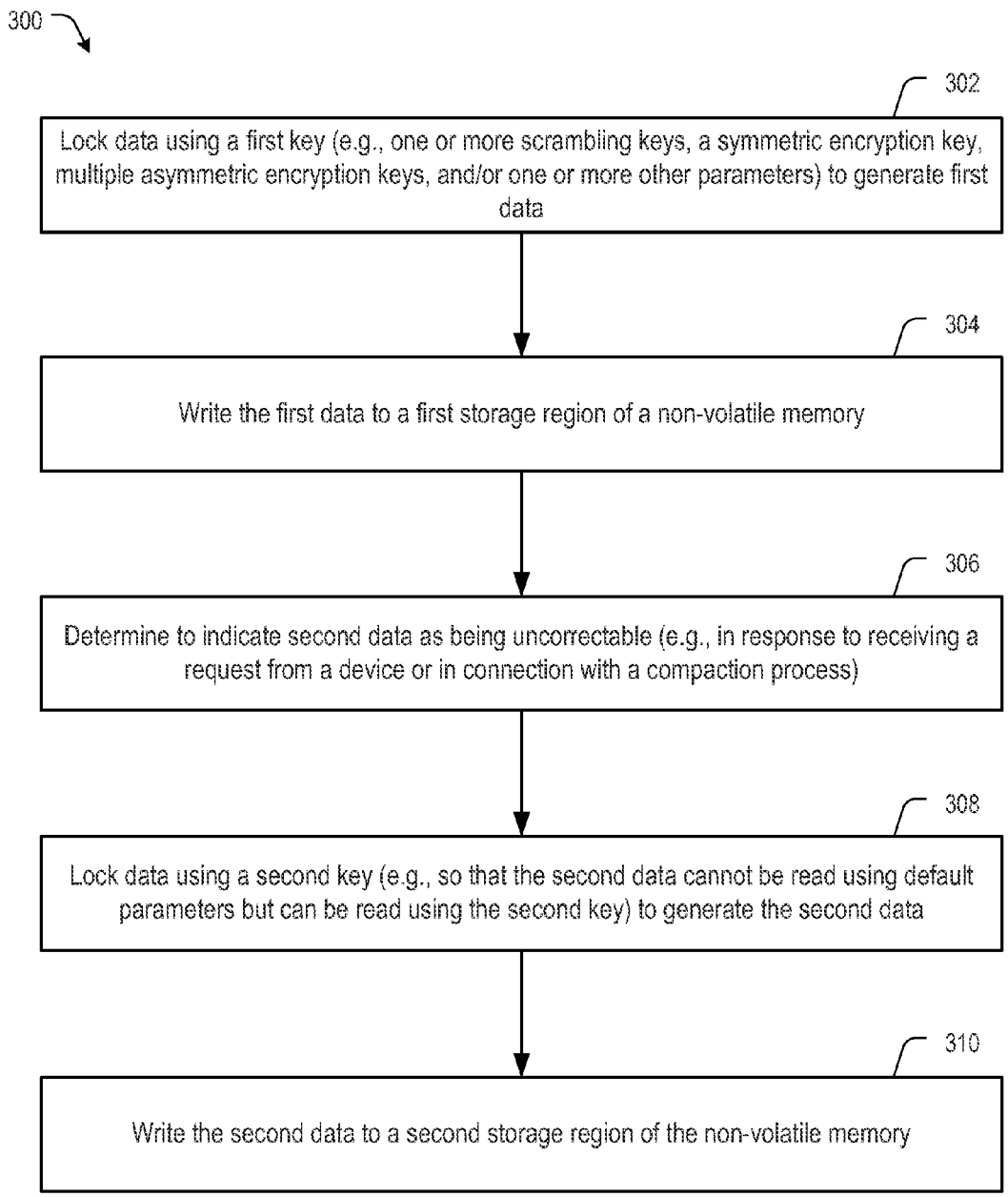
FIG. 3 is a flow chart of a particular illustrative embodiment of a method of locking data at a data storage device.

Referring to FIG. 3, a particular illustrative example of a method is depicted and generally designated 300. The method 300 may be performed at a data storage device, such as at the data storage device 102 of FIG. 1.

The method 300 may include locking data using a first key to generate first data, at 302. For example, the data 172 may be locked using the first key 138 to generate the first data 121. To further illustrate, the first key 138 may include one or more scrambling keys, a symmetric encryption key, multiple asymmetric encryption keys, and/or one or more other parameters.

The method 300 may further include writing the first data to a first storage region of a memory, at 304. As an example, the first data 121 may be written to the first storage region 111 of the memory 104.

The method 300 may further include determining to indicate second data as being uncorrectable, at 306. For example, the request 150 of FIG. 1 may indicate that the data storage device 102 is to return a message (e.g., the message 156) indicating that the second data 122 is uncorrectable in response to a request for read access to the second data 122 (e.g., in response to the read request 160). As another example, a process may include writing information (e.g., dummy data) to the memory 104 that is to be flagged as being uncorrectable (e.g., in connection with a compaction process).

The method 300 may further include locking data using a second key to generate the second data, at 308. For example, the dummy data 144 may be locked using the second key 140 to generate the second data 122 (so that the second data 122 cannot be read using default parameters (e.g., the first key 138) but can be read using the second key 140).

The method 300 may further include writing the second data to a second storage region of the memory, at 310. For example, the second data 122 may be written to the second storage region 112 of the memory 104 in connection with the method 300 of FIG. 3.

The method 300 of FIG. 3 may improve performance of a data storage device. For example, the method 300 may enable a data storage device to flag data as being uncorrectable without use of one or more tables to identify data flagged as being uncorrectable, which may be large and which may consume storage space of a data storage device.

Figure 4:
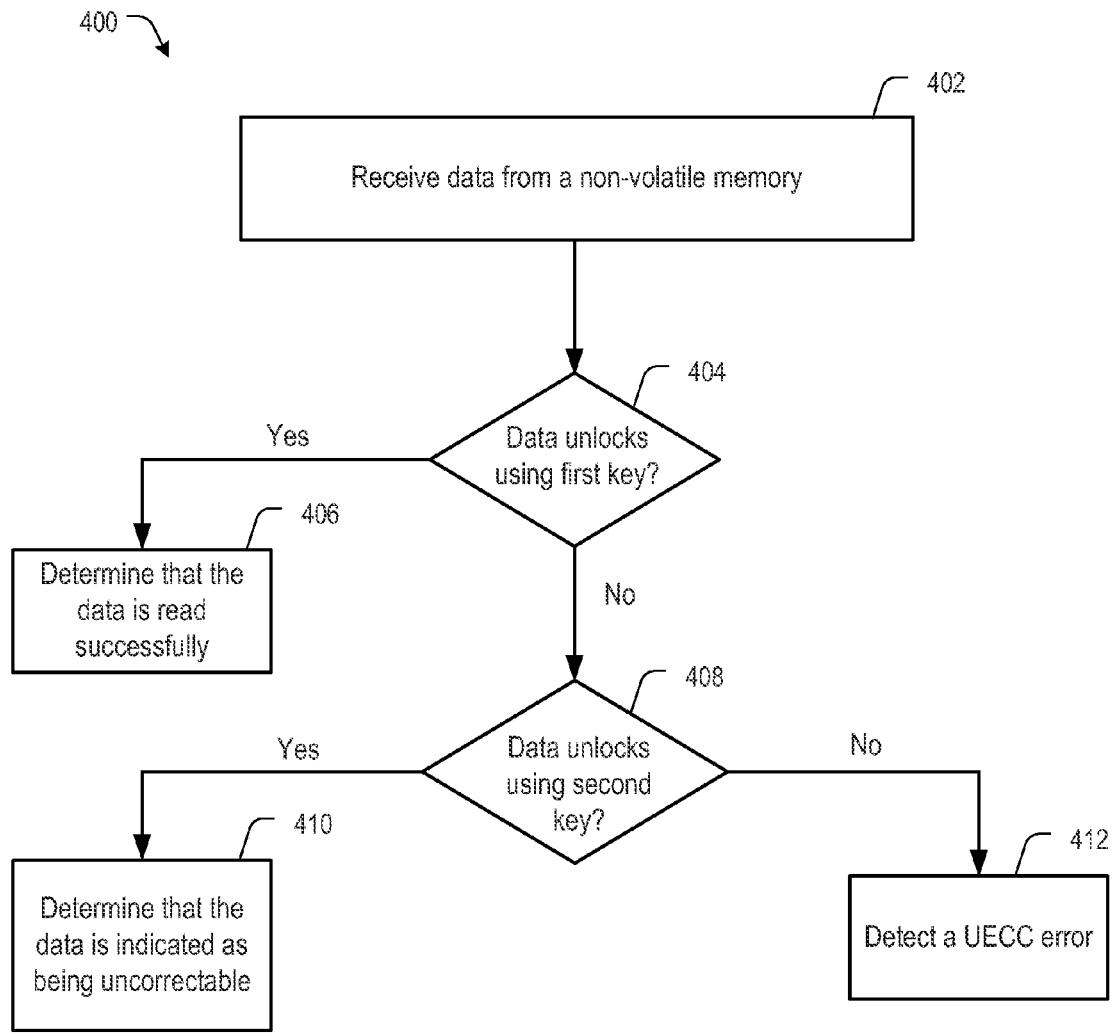
FIG. 4 is a flow chart of a particular illustrative example of a method of processing locked data at a data storage device.

Referring to FIG. 4, a particular illustrative example of a method is depicted and generally designated 400. The method 400 may be performed at a data storage device, such as at the data storage device 102 of FIG. 1.

The method 400 may include receiving data from the memory, at 402. For example, the controller 130 of FIG. 1 may receive any of the first data 121, the second data 122, the third data 123, or the data 204 from the memory 104.

The method 400 may further include determining (e.g., using the signature verifier 224 of FIG. 2) whether the data unlocks using a first key, at 404. For example, the first key may correspond to the first key 138, and the data unlocking engine 134 may be configured to attempt to unlock the data using the first key 138.

If the data is unlocked using the first key, then a determination may be made that the data is read successfully, at 406. In this case, the data may include the first data 121, as an illustrative example. The data unlocking engine 134 may be configured to determine that the data is read successfully if the data is unlocked using the first key 138.

If the first key fails to unlock the data, then the method 400 may further include determining (e.g., using the signature verifier 224 of FIG. 2) whether the data unlocks using a second key, at 408. For example, the second key may correspond to the second key 140, and the data unlocking engine 134 may be configured to use the second key 140 in response to failing to unlock the data using the first key 138.

If the data is unlocked using the second key, then a determination may be made that the data is flagged as being uncorrectable, at 410. In this case, the data may include the second data 122, as an illustrative example. The method 400 may optionally include sending the message 156 to the device 170 to indicate that the data is uncorrectable.

If the second key fails to unlock the data, then the method 400 may further include detecting a UECC error, at 412. In this case, the data may include the third data 123, as an illustrative example. In some circumstances, the UECC error may result from a hardware error or physical defect of the memory 104. The method 400 may optionally include updating the table 136 to indicate the UECC error (e.g., to track a number of UECC errors at a particular storage region of the memory 104 to enable the controller 130 to detect a hardware error or a physical defect associated with the particular storage region).

The method 400 may improve performance of a data storage device. For example, the method 400 may enable a data storage device identify data indicated as being uncorrectable (e.g., W/U data) without storing and accessing a table that indicates the data as being uncorrectable. Thus, available memory space may be increased.

Figure 5:
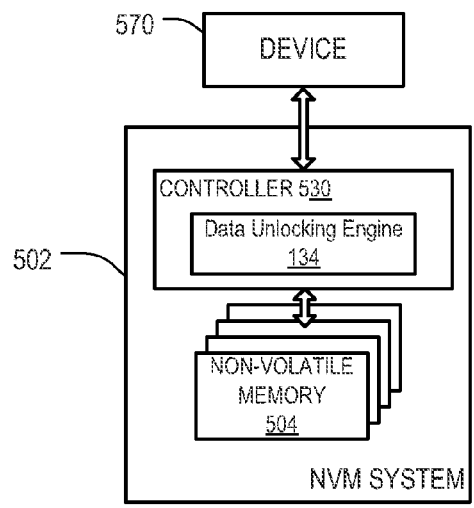
FIG. 5 is a block diagram of a particular illustrative embodiment of a non-volatile memory system.

Referring to FIG. 5, a non-volatile memory system 502 (e.g., the data storage device 102) may be coupled to a device 570 (e.g., the device 170 of FIG. 1). The non-volatile memory system 502 includes a controller 530 (e.g., the controller 130 of FIG. 1) and non-volatile memory that may be made up of one or more non-volatile memory dies 504 (e.g., one or more memory dies included in the memory device 103 of FIG. 1). As used herein, the term "memory die" refers to the collection of non-volatile memory cells, and associated circuitry for managing the physical operation of those non-volatile memory cells, that are formed on a single semiconductor substrate. The controller 530 interfaces with the device 570 and transmits command sequences for read, program, and erase operations to the one or more non-volatile memory dies 504. The controller 530 includes the data unlocking engine 134.

The controller 530 (which may be a flash memory controller) may take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 530 may be configured with hardware and/or firmware to perform the various functions described below and shown in the flow diagrams. Also, some of the components shown as being internal to the controller 530 can be stored external to the controller 530, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory, map out bad flash memory cells, and allocate spare cells to be substituted for future failed cells. Some part of the spare cells can be used to hold firmware to operate the flash memory controller and implement other features. In operation, when a host device is to read data from or write data to the flash memory, the host device communicates with the flash memory controller. If the host device provides a logical address to which data is to be read/written, the flash memory controller can convert the logical address received from the host device to a physical address in the flash memory. (Alternatively, the host device can provide the physical address.) The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

The one or more non-volatile memory dies 504 may include any suitable non-volatile storage medium, including NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between the controller 530 and the one or more non-volatile memory dies 504 may be any suitable flash interface, such as Toggle Mode. In one embodiment, the non-volatile memory system 502 may be a card based system, such as a secure digital (SD) or a micro secure digital (micro-SD) card. In an alternate embodiment, the non-volatile memory system 502 may be part of an embedded memory system.

Although, in the example illustrated in FIG. 5, the non-volatile memory system 502 (sometimes referred to herein as a storage module) includes a single channel between the controller 530 and the one or more non-volatile memory dies 504, the subject matter described herein is not limited to having a single memory channel. For example, in some NAND memory system architectures (such as the ones shown in FIGS. 6 and 7), 2, 4, 8 or more NAND channels may exist between the controller 530 and the NAND memory device, depending on controller capabilities. In any of the embodiments described herein, more than a single channel may exist between the controller 530 and the one or more non-volatile memory dies 504, even if a single channel is shown in the drawings.

Figure 6:
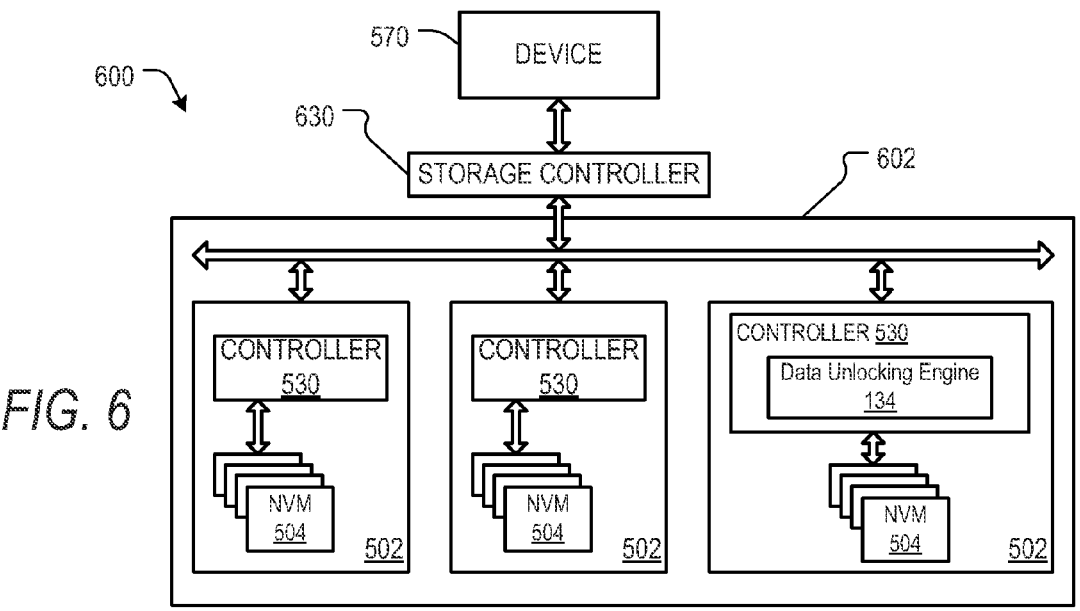
FIG. 6 is a block diagram of a particular illustrative embodiment of a storage system including a plurality of the non-volatile memory systems of FIG. 5.

FIG. 6 illustrates a storage system 600 that includes multiple non-volatile memory systems 502. As such, storage system 600 may include a storage controller 630 that interfaces with the device 570 (e.g., a host device) and with a storage system 602, which includes a plurality of non-volatile memory systems 502. The interface between the storage controller 630 and the non-volatile memory systems 502 may be a bus interface, such as a serial advanced technology attachment (SATA) or peripheral component interface express (PCIe) interface. The storage system 600 may correspond to a solid state drive (SSD), such as found in portable computing devices, such as laptop computers, and tablet computers. One or more of the controllers 530 of FIG. 6 may include a data unlocking engine corresponding to the data unlocking engine 134. The storage controller 630 may include a data unlocking engine corresponding to the data unlocking engine 134.

Figure 7:
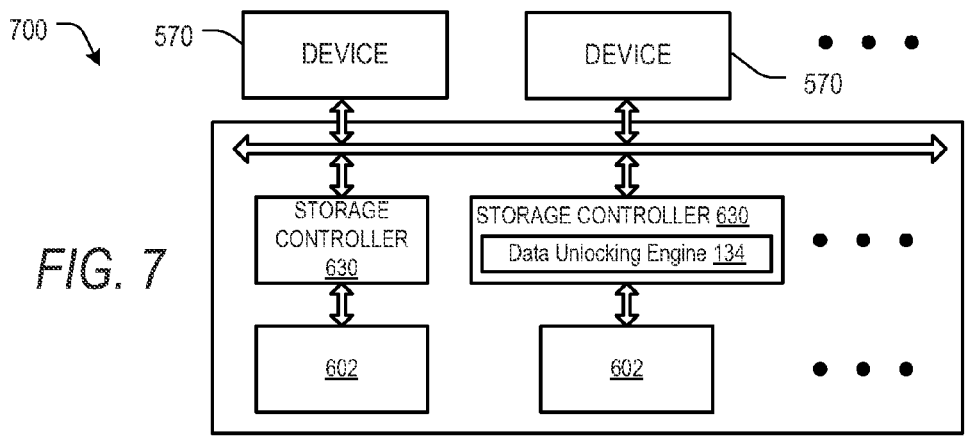
FIG. 7 is a block diagram of a particular illustrative embodiment of a hierarchical storage system.

FIG. 7 is a block diagram illustrating a hierarchical storage system 700. The hierarchical storage system 700 includes a plurality of storage controllers 630, each of which controls a respective storage system 602. Devices 570 (e.g., one or more host devices or accessing devices) may access memories within the hierarchical storage system 700 via a bus interface. In one embodiment, the bus interface may be an NVMe or fiber channel over Ethernet (FCoE) interface. In one embodiment, the hierarchical storage system 700 illustrated in FIG. 7 may be a rack mountable mass storage system that is accessible by multiple host computers, such as would be found in a data center or other location where mass storage is needed. One or more storage controllers 630 of FIG. 7 may include a data unlocking engine corresponding to the data unlocking engine 134.

Figure 8:
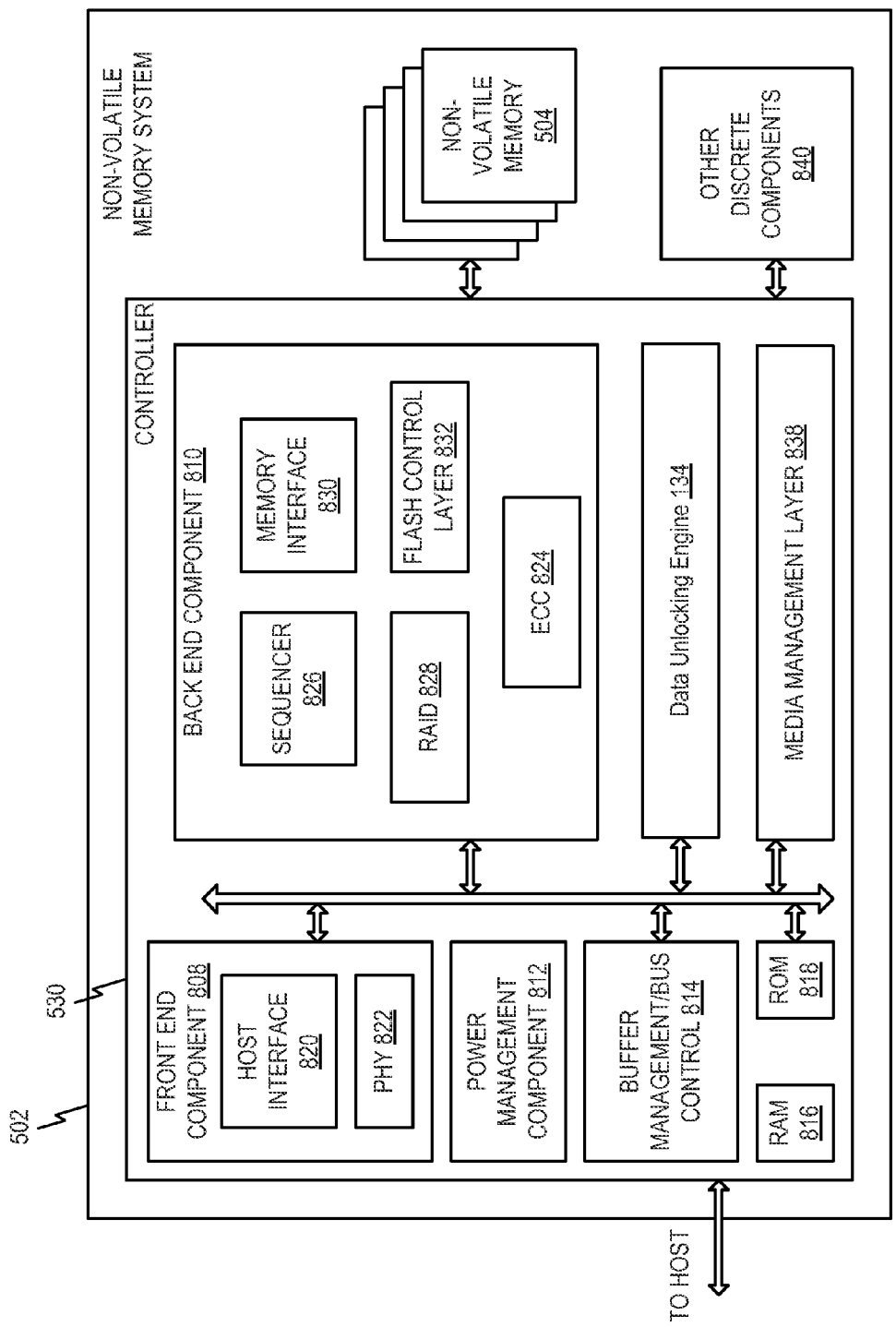
FIG. 8 is a block diagram of components of a particular illustrative embodiment of a controller.

FIG. 8 is a block diagram illustrating exemplary components of the controller 530 of the non-volatile memory system 502 in more detail. The controller 530 includes the data unlocking engine 134. The controller 530 also includes a front end component 808 that interfaces with a host device, a back end component 810 that interfaces with the one or more non-volatile memory dies 504, and various other modules that perform other functions. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example.

Referring again to the controller 530, a buffer manager/bus controller 814 manages buffers in random access memory (RAM) 816 and controls the internal bus arbitration of the controller 530. A read only memory (ROM) 818 stores system boot code. Although illustrated in FIG. 8 as located within the controller 530, in other embodiments one or both of the RAM 816 and the ROM 818 may be located externally to the controller 530. In yet other embodiments, portions of RAM and ROM may be located both within the controller 530 and outside the controller 530.

Front end component 808 includes a host interface 820 and a physical layer interface (PHY) 822 that provide the electrical interface with the host device or next level storage controller. The choice of the type of host interface 820 can depend on the type of memory being used. Examples of host interfaces 820 include, but are not limited to, SATA, SATA Express, SAS, Fibre Channel, USB, PCIe, and NVMe. The host interface 820 typically facilitates transfer for data, control signals, and timing signals.

Back end component 810 includes an error correcting code (ECC) engine 824 that encodes the data received from the host device, and decodes and error corrects the data read from the non-volatile memory, such as any of the data 121, 122, and 123 of FIG. 1. A command sequencer 826 generates command sequences, such as program and erase command sequences, to be transmitted to the one or more non-volatile memory dies 504. A RAID (Redundant Array of Independent Drives) component 828 manages generation of RAID parity and recovery of failed data. The RAID parity may be used as an additional level of integrity protection for the data being written into the one or more non-volatile memory dies 504. In some cases, the RAID component 828 may be a part of the ECC engine 824. A memory interface 830 provides the command sequences to non-volatile memory die 504 and receives status information from the one or more non-volatile memory dies 504. For example, the memory interface 830 may be a double data rate (DDR) interface, such as a Toggle Mode interface. A flash control layer 832 controls the overall operation of back end component 810.

Additional components of the non-volatile memory system 502 illustrated in FIG. 8 include a power management component 812 and a media management layer 838, which performs wear leveling of memory cells of the one or more non-volatile memory dies 504. The non-volatile memory system 502 may also include one or more other components illustrated with reference to FIGS. 1 and 2, such as the data locking engine 132, as an illustrative example. Non-volatile memory system 502 also includes other discrete components 840, such as external electrical interfaces, external RAM, resistors, capacitors, or other components that may interface with the controller 530. In alternative embodiments, one or more of the physical layer interface 822, RAID component 828, media management layer 838 and buffer management/bus controller 814 are optional components that are omitted from the controller 530.

Figure 9:
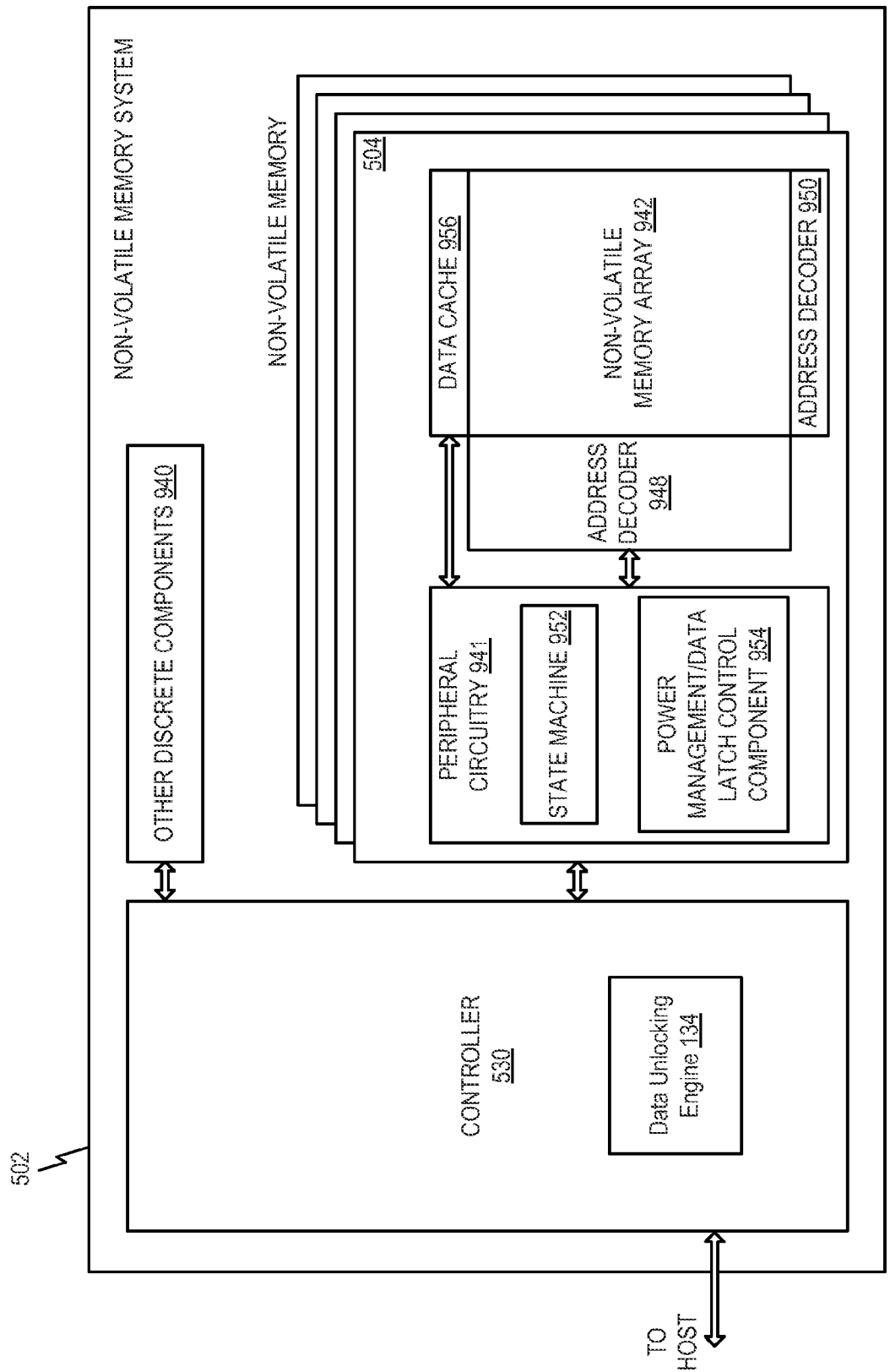
FIG. 9 is a block diagram of components of a particular illustrative embodiment of a non-volatile memory die.

FIG. 9 is a block diagram illustrating exemplary components of the one or more non-volatile memory dies 504 of the non-volatile memory system 502 in more detail. The one or more non-volatile memory dies 504 include peripheral circuitry 941 and a non-volatile memory array 942. The non-volatile memory array 942 includes the non-volatile memory cells used to store data. The non-volatile memory cells may be any suitable non-volatile memory cells, including NAND flash memory cells and/or NOR flash memory cells in a two dimensional and/or three dimensional configuration. The peripheral circuitry 941 includes a state machine 952 that provides status information to the controller 530, which may include the data unlocking engine 134. The peripheral circuitry 941 may also include a power management or data latch control component 954. The one or more non-volatile memory dies 504 further include discrete components 940, an address decoder 948, an address decoder 950, and a data cache 956 that caches data.

The data unlocking engine 134 may be configured to receive data sensed from the one or more non-volatile memory dies 504, such as any of the data 121, 122, and 123 of FIG. 1. The data unlocking engine 134 may be configured to use the keys 138, 140 to unlock data sensed from the one or more non-volatile memory dies 504. For example, the data unlocking engine 134 may be configured to use the first key 138 to unlock user data sensed from the one or more non-volatile memory dies 504. As another example, the data unlocking engine 134 may be configured to use the second key 140 to unlock data indicated as being uncorrectable and sensed from the one or more non-volatile memory dies 504.

Although various components depicted herein are illustrated as block components and described in general terms, such components may include one or more microprocessors, state machines, or other circuits configured to enable such components to perform one or more operations described herein. For example, the data locking engine 132 may represent physical components, such as hardware controllers, state machines, logic circuits, or other structures, to enable the controller 130 to lock data using the first key 138 and/or the second key 140. As another the data unlocking engine 134 may represent physical components, such as hardware controllers, state machines, logic circuits, or other structures, to enable the controller 130 to unlock data using the first key 138 and/or the second key 140.

Alternatively or in addition, the data locking engine 132 may be implemented using a microprocessor or microcontroller programmed to lock data using the first key 138 and/or the second key 140 and/or the data unlocking engine 134 may be implemented using a microprocessor or microcontroller programmed to unlock data using the first key 138 and/or the second key 140. In a particular embodiment, one or more of the data locking engine 132 or the data unlocking engine 134 includes a processor executing instructions (e.g., firmware) that are stored at the memory 104. Alternatively, or in addition, executable instructions that are executed by the processor may be stored at a separate memory location that is not part of the memory 104, such as at a read-only memory (ROM).

It should be appreciated that one or more operations described herein as being performed by the controller 130 may be performed at the memory device 103. As an illustrative example, in-memory ECC operations (e.g., encoding operations and/or decoding operations) may be performed at the memory device 103 alternatively or in addition to performing such operations at the controller 130.

The data storage device 102 may be coupled to, attached to, or embedded within one or more accessing devices, such as within a housing of the device 170. For example, the data storage device 102 may be embedded within the device 170 in accordance with a Joint Electron Devices Engineering Council (JEDEC) Solid State Technology Association Universal Flash Storage (UFS) configuration. To further illustrate, the data storage device 102 may be integrated within an electronic device (e.g., the device 170), such as a mobile telephone, a computer (e.g., a laptop, a tablet, or a notebook computer), a music player, a video player, a gaming device or console, an electronic book reader, a personal digital assistant (PDA), a portable navigation device, or other device that uses internal non-volatile memory.

In one or more other implementations, the data storage device 102 may be implemented in a portable device configured to be selectively coupled to one or more external devices, such as a host device. For example, the data storage device 102 may be removable from the device 170 (i.e., "removably" coupled to the device 170). As an example, the data storage device 102 may be removably coupled to the device 170 in accordance with a removable universal serial bus (USB) configuration.

The device 170 may correspond to a mobile telephone, a computer (e.g., a laptop, a tablet, or a notebook computer), a music player, a video player, a gaming device or console, an electronic book reader, a personal digital assistant (PDA), a portable navigation device, another electronic device, or a combination thereof. The device 170 may communicate via a controller, which may enable the device 170 to communicate with the data storage device 102. The device 170 may operate in compliance with a JEDEC Solid State Technology Association industry specification, such as an embedded MultiMedia Card (eMMC) specification or a Universal Flash Storage (UFS) Host Controller Interface specification. In these examples, the request 150, the message 156, and the read request 160 may comply with a JEDEC specification, such as an eMMC specification of a UFS specification. The device 170 may operate in compliance with one or more other specifications, such as a Secure Digital (SD) Host Controller specification as an illustrative example. In this example, the request 150, the message 156, and the read request 160 may comply with an SD specification. Alternatively, the device 170 may communicate with the data storage device 102 in accordance with another communication protocol. In some implementations, the system 100, the data storage device 102, or the memory 104 may be integrated within a network-accessible data storage system, such as an enterprise data system, an NAS system, or a cloud data storage system, as illustrative examples. In these examples, the request 150, the message 156, and the read request 160 may comply with a network protocol, such as an Ethernet protocol, a local area network (LAN) protocol, or an Internet protocol, as illustrative examples.

In some implementations, the data storage device 102 may include a solid state drive (SSD). The data storage device 102 may function as an embedded storage drive (e.g., an embedded SSD drive of a mobile device), an enterprise storage drive (ESD), a cloud storage device, a network-attached storage (NAS) device, or a client storage device, as illustrative, non-limiting examples. In some implementations, the data storage device 102 may be coupled to the device 170 via a network. For example, the network may include a data center storage system network, an enterprise storage system network, a storage area network, a cloud storage network, a local area network (LAN), a wide area network (WAN), the Internet, and/or another network.

To further illustrate, the data storage device 102 may be configured to be coupled to the device 170 as embedded memory, such as in connection with an embedded MultiMedia Card (eMMC®) (trademark of JEDEC Solid State Technology Association, Arlington, Va.) configuration, as an illustrative example. The data storage device 102 may correspond to an eMMC device. As another example, the data storage device 102 may correspond to a memory card, such as a Secure Digital (SD®) card, a microSD® card, a miniSD™ card (trademarks of SD-3C LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.). The data storage device 102 may operate in compliance with a JEDEC industry specification. For example, the data storage device 102 may operate in compliance with a JEDEC eMMC specification, a JEDEC Universal Flash Storage (UFS) specification, one or more other specifications, or a combination thereof.

The memory 104 may include a resistive random access memory (ReRAM), a flash memory (e.g., a NAND memory, a NOR memory, a single-level cell (SLC) flash memory, a multi-level cell (MLC) flash memory, a divided bit-line NOR (DINOR) memory, an AND memory, a high capacitive coupling ratio (HiCR) device, an asymmetrical contactless transistor (ACT) device, or another flash memory), an erasable programmable read-only memory (EPROM), an electrically-erasable programmable read-only memory (EEPROM), a read-only memory (ROM), a one-time programmable memory (OTP), another type of memory, or a combination thereof. In a particular embodiment, the data storage device 102 is indirectly coupled to an accessing device (e.g., the device 170) via a network. For example, the data storage device 102 may be a network-attached storage (NAS) device or a component (e.g., a solid-state drive (SSD) component) of a data center storage system, an enterprise storage system, or a storage area network. The memory 104 may include a semiconductor memory device.

Semiconductor memory devices include volatile memory devices, such as dynamic random access memory ("DRAM") or static random access memory ("SRAM") devices, non-volatile memory devices, such as resistive random access memory ("ReRAM"), magnetoresistive random access memory ("MRAM"), electrically erasable programmable read only memory ("EEPROM"), flash memory (which can also be considered a subset of EEPROM), ferroelectric random access memory ("FRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure. In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate). As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Alternatively, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this disclosure is not limited to the two dimensional and three dimensional exemplary structures described but cover all relevant memory structures within the spirit and scope of the disclosure as described herein and as understood by one of skill in the art. The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments. Those of skill in the art will recognize that such modifications are within the scope of the present disclosure.

The above-disclosed subject matter is to be considered illustrative, and not restrictive, and the appended claims are intended to cover all such modifications, enhancements, and other embodiments, that fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A data storage device comprising:
a memory configured to store first data and second data; and
a controller coupled to the memory, the controller configured to unlock the first data using a first key, to lock the second data in response to a determination that the second data is to be indicated as being uncorrectable, and to unlock the second data using a second key, the second data indicated as being uncorrectable in response to unlocking the second data using the second key.

2. The data storage device of claim 1, wherein the controller is further configured to send a message to a device in response to unlocking the second data using the second key.

3. The data storage device of claim 2, wherein the message includes a particular sequence of bit values that indicates a write uncorrectable (W/U) data error.

4. The data storage device of claim 2, wherein the controller is further configured to write the second data to the memory in response to receiving a request from the device prior to unlocking the second data and to lock the second data to enable avoidance of storing and accessing a table that indicates that the second data is flagged as uncorrectable.

5. The data storage device of claim 4, wherein the request indicates that the controller is to associate one or more logical addresses with write uncorrectable (W/U) data.

6. The data storage device of claim 5, wherein the controller is further configured to access the second data from the memory in response to receiving a read request from the device.

7. The data storage device of claim 6, wherein the read request indicates the one or more logical addresses.

8. The data storage device of claim 1, wherein the second data includes dummy data generated by the controller.

9. The data storage device of claim 1, wherein the controller includes a data unlocking engine configured to attempt to unlock the second data using the first key and to determine that the second data is read successfully if the second data is unlocked using the first key.

10. The data storage device of claim 9, wherein the data unlocking engine is further configured to use the second key to unlock the second data in response to failing to unlock the second data using the first key.

11. The data storage device of claim 1, wherein the controller is further configured to detect an uncorrectable error correcting code (UECC) error in response to failing to unlock the second data using the second key.

12. The data storage device of claim 11, wherein the controller is further configured to store a table indicating one or more UECC errors and to update the table to indicate the UECC error in response to failing to unlock the second data using the second key.

13. The data storage device of claim 1, wherein one or more of the first key or the second key includes one or more scrambling keys, a symmetric encryption key, multiple asymmetric encryption keys, one or more other parameters, or a combination thereof.

14. The data storage device of claim 1, wherein the controller includes a data locking engine configured to lock the first data using the first key and to lock the second data using the second key.

15. A method comprising:
at a data storage device that includes a memory and a controller, performing by the controller:
unlocking first data retrieved from the memory using a first key;
locking second data based on a second key in response to a determination that the second data is to be indicated as being uncorrectable; and
unlocking the second data using the second key, wherein in response to unlocking the second data using the second key, the second data is indicated as being uncorrectable.

16. The method of claim 15, further comprising sending a message to a device in response to unlocking the second data using the second key.

17. The method of claim 16, wherein the message includes a particular sequence of bit values that indicates a write uncorrectable (W/U) data error.

18. The method of claim 15, further comprising writing the second data to the memory in response to receiving a request from a device prior to unlocking the second data.

19. The method of claim 18, wherein the request indicates that the controller is to associate one or more logical addresses with write uncorrectable (W/U) data.

20. The method of claim 19, further comprising accessing the second data from the memory in response to receiving a read request from the device.

21. The method of claim 20, wherein the read request indicates the one or more logical addresses.

22. The method of claim 15, wherein the second data includes dummy data generated by the controller.

23. The method of claim 15, further comprising attempting to unlock the second data using the first key, wherein the second key is applied to the second data in response to failing to unlock the second data using the first key.

24. The method of claim 15, further comprising detecting an uncorrectable error correcting code (UECC) error in response to failing to unlock the second data using the second key.

25. The method of claim 24, further comprising updating a table to indicate the UECC error in response to failing to unlock the second data using the second key.

26. The method of claim 15, wherein one or more of the first key or the second key includes one or more scrambling keys, a symmetric encryption key, multiple asymmetric encryption keys, one or more other parameters, or a combination thereof.

27. An apparatus comprising:
means for storing data; and
means for locking first data using a first key, the first data associated with a first storage region of the means for storing data, and for locking second data using a second key, the second data associated with a second storage region of the means for storing data, the second data locked using the second key in response to a determination that the second data is to be indicated as being uncorrectable.

28. The apparatus of claim 27, further comprising means for receiving, from an access device, a request to indicate the second data as being uncorrectable.

29. The apparatus of claim 27, further comprising means for initiating a compaction process that stores dummy data to the second storage region, wherein the means for locking is configured to determine that the dummy data is to be indicated as being uncorrectable in response to initiation of the compaction process.

* * * * *